US007949084B2

(12) United States Patent
Song et al.

(10) Patent No.: US 7,949,084 B2
(45) Date of Patent: May 24, 2011

(54) PASSIVE COOLING AND ARRESTING DEVICE FOR MOLTEN CORE MATERIAL

(75) Inventors: Jin Ho Song, Daejeon (KR); Hwan Yeol Kim, Daejeon (KR); Beong Tae Min, Daejeon (KR); Hee Dong Kim, Daejeon (KR)

(73) Assignees: Korea Atomic Energy Research Institute, Daejeon (KR); Korea Hydro & Nuclear Power Co, Ltd., Seoul (KR)

( * ) Notice: Subject to any disclaimer, the term of this patent is extended or adjusted under 35 U.S.C. 154(b) by 279 days.

(21) Appl. No.: 10/589,274

(22) PCT Filed: Feb. 7, 2005

(86) PCT No.: PCT/KR2005/000369
§ 371 (c)(1),
(2), (4) Date: Apr. 11, 2008

(87) PCT Pub. No.: WO2005/076285
PCT Pub. Date: Aug. 18, 2005

(65) Prior Publication Data
US 2009/0116607 A1 May 7, 2009

(30) Foreign Application Priority Data
Feb. 10, 2004 (KR) ........................ 10-2004-0008767

(51) Int. Cl.
G21C 9/00 (2006.01)
(52) U.S. Cl. ........................................ 376/280; 376/277
(58) Field of Classification Search .................. 376/280, 376/277, 298–300
See application file for complete search history.

(56) References Cited

U.S. PATENT DOCUMENTS

| | | | | |
|---|---|---|---|---|
| 3,984,282 A | * | 10/1976 | Kleimola | 376/282 |
| 4,141,224 A | * | 2/1979 | Alger et al. | 62/50.1 |
| 4,310,385 A | * | 1/1982 | Rosewell | 376/280 |

(Continued)

FOREIGN PATENT DOCUMENTS

JP 4286994 A 10/1992

(Continued)

OTHER PUBLICATIONS

U.S. Nuclear Regulatory Commission, Appendix A to Part 50—General Design Criteria for Nuclear Power Plants, Jan. 1, 1994, 11 pages incl. cover page.*
Merriam-Webster's Collegiate Dictionary, tenth edition, p. 1223.*

*Primary Examiner* — Rick Palabrica

(57) ABSTRACT

An apparatus for passively cooling and retaining molten core material discharged from a damaged reactor vessel during a severe accident in the nuclear plant including: a molten core material retention tank to retain molten core material; a compressed gas tank storing high-pressure inert gas; a cooling water storage tank being installed higher than the molten core material retention tank; and a mixing means. The molten core material retention tank includes an outer retention vessel having at least one coolant hole, a porous protection vessel formed at an inside of the outer retention vessel, and a gravel layer formed between the outer retention vessel and the porous protection vessel. The apparatus can be installed in a reactor cavity without changing the compartment structure of a containment building, and makes it possible to prevent a steam explosion during the cooling process for the ultrahigh-temperature molten core material and to secure the reliability of the cooling process.

8 Claims, 3 Drawing Sheets

U.S. PATENT DOCUMENTS

| | | | |
|---|---|---|---|
| 4,382,907 A * | 5/1983 | Robin | 376/283 |
| H091 H * | 7/1986 | Gabor et al. | 376/280 |
| 5,295,169 A * | 3/1994 | Tominaga et al. | 376/293 |
| 5,309,489 A * | 5/1994 | Tate et al. | 376/299 |
| 5,426,681 A * | 6/1995 | Aburomia | 376/283 |
| 5,802,125 A * | 9/1998 | Fife | 376/203 |
| 6,192,097 B1 * | 2/2001 | Hau et al. | 376/280 |
| 6,195,405 B1 * | 2/2001 | Hwang et al. | 376/280 |
| 6,353,651 B1 * | 3/2002 | Gou et al. | 376/280 |
| 6,658,077 B2 * | 12/2003 | Alsmeyer et al. | 376/280 |
| 7,218,101 B2 * | 5/2007 | Kuljis et al. | 324/219 |

FOREIGN PATENT DOCUMENTS

| | | |
|---|---|---|
| JP | 8043575 A | 2/1996 |
| KR | 100265320 B1 | 6/2000 |

\* cited by examiner

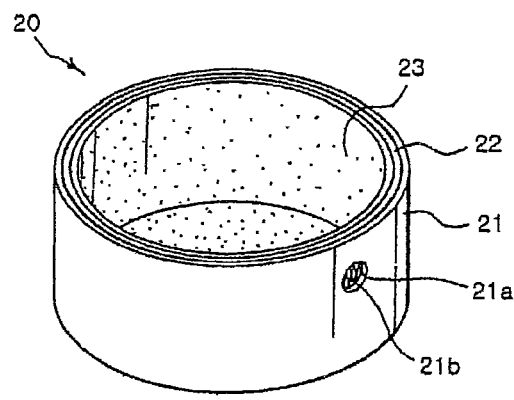
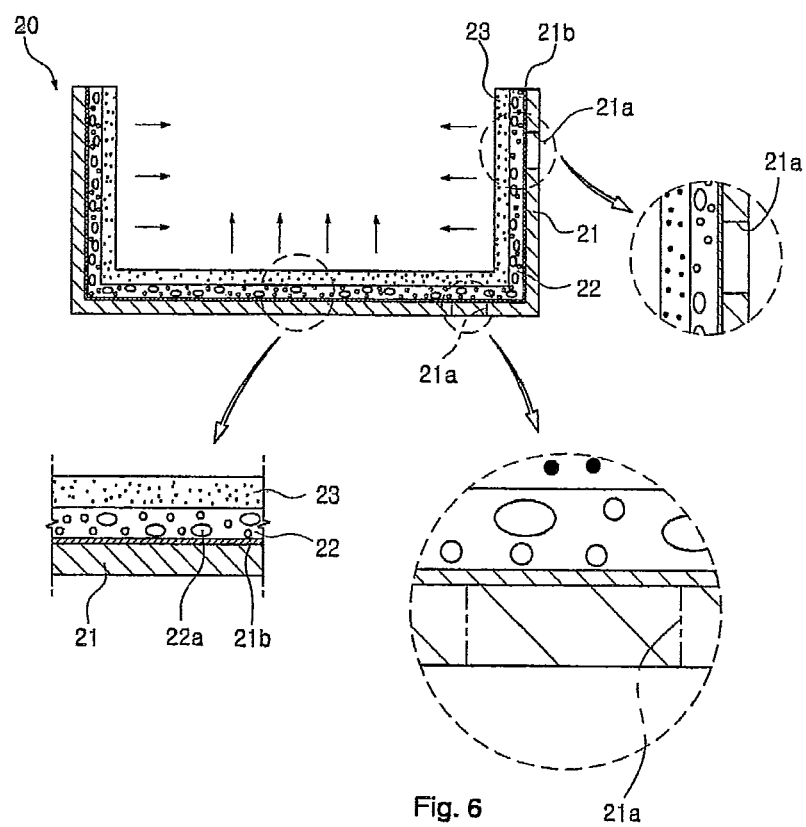
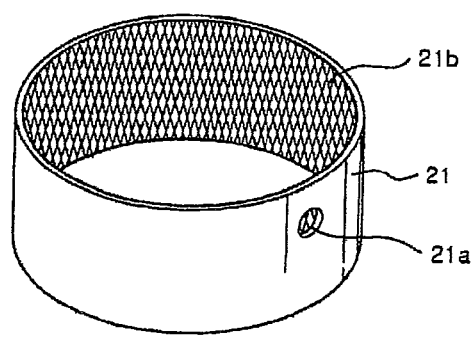

PASSIVE COOLING AND ARRESTING DEVICE FOR MOLTEN CORE MATERIAL

TECHNICAL FIELD

The present invention relates to an apparatus for passively cooling and retaining molten core material, and more particularly, to an apparatus for passively cooling and retaining molten core material, which can passively cool, solidify and retain ultrahigh-temperature radioactive molten core material, which is discharged from a damaged nuclear reactor vessel during a severe accident in a nuclear plant, in a reactor cavity so as to prevent the discharged molten core material from damaging a neighboring structure, threatening the safety of workers, threatening the integrity of the reactor containment, or contaminating water sources or soil.

BACKGROUND ART

Generally, a nuclear plant includes hundreds of systems having separate functions. These systems are roughly classified into a nuclear steam supply system (NSSS) having a nuclear reactor as its main element, a turbine/generator system having a generator driven by supplied steam and other auxiliary equipments. Here, the nuclear reactor controls large amount of energy instantaneously emitted during a nuclear reaction to be slowly released so that nuclear energy can be utilized for generating electricity.

However, when molten core material discharged from a damaged reactor vessel during a severe accident in the nuclear plant is not effectively retained and cooled, the discharged molten core material may ablate the concrete structure of a reactor cavity, contaminate neighboring soil, and threaten the structural integrity of a containment building.

Accordingly, apparatuses and methods for retaining and suitably cooling the discharged molten core material have been constantly studied.

FIG. 1 illustrates a conventional apparatus for retaining and cooling discharged molten core material, which is disclosed in a Korean Patent No. 0265320.

In the conventional apparatus shown in FIG. 1, a multi-layered cell-type cooling water retention tank 110 is installed below a reactor vessel 100 and filled with cooling water 120 in order to sequentially cool ultrahigh-temperature molten core material discharged from the reactor vessel 100.

However, the so-constructed conventional apparatus cannot be installed in a containment building for existing nuclear reactors because the containment building must be greatly altered in its compartment structure so as to install the apparatus therein.

Also, the apparatus has a problem in that the ultrahigh-temperature molten core material melts the cooling water retention tank 110 and then reacts directly with the cooling water in the cooling water retention tank 110 thereby to generate steam violently, whereby a steam explosion may undesirably occur.

As another conventional apparatus for retaining and cooling the discharged molten core material, FIG. 2 illustrates a core catcher having elongated molten core material catch parts, disclosed in Japanese Patent Publication No. 1996-43575.

As shown in FIG. 2, the conventional apparatus has a plurality of molten core material catcher parts 130 installed below a reactor vessel 100. In the apparatus, molten core material discharged from the reactor vessel 100 during a severe accident in a nuclear plant is retained in the molten core material catcher parts 130, and the retained molten core material is cooled by cooling water 120 filled around the molten core material catcher parts 130.

However, the above-described apparatus cools the molten core material of high temperature by bringing the molten core material into indirect contact with the cooling water. Accordingly, heat transfer efficiency between the molten core material and the cooling water is low and thus a very large cooling water tank is required.

Also, there has been proposed an apparatus for actively cooling the molten core material by using a pump. However, the pump may not be operated when a severe accident occurs in a nuclear plant, whereby the apparatus has low reliability. Further, the cooling ability of the pump is degraded as time goes on, whereby the decay heat of the molten core material cannot be effectively removed.

Accordingly, there is required an improved apparatus for passively cooling and retaining the molten core material, which can solve the above-described problems of the related art.

SUMMARY OF THE INVENTION

One object of the present invention is to provide an improved apparatus for passively cooling and retaining molten core material, which can greatly reduce the possibility of steam explosion during the direct interaction between ultrahigh-temperature molten core material and cooling water, can effectively remove the decay heat of the molten core material, and can be assembled in a containment building for both existing nuclear reactors and newly constructed nuclear reactors.

In order to achieve the above objects, the present invention provides an apparatus for passively cooling and retaining molten core material from a reactor, the apparatus comprising: a molten core material retention tank installed below a reactor vessel to retain molten core material discharged from the reactor vessel; a compressed gas tank having an outlet valve at an outlet thereof and supplying high-pressure inert gas; a cooling water storage tank being installed higher than the molten core material retention tank, having an outlet valve at an outlet thereof, and supplying cooling water, and a means for mixing inert gas supplied from the compressed gas tank with cooling water supplied from the cooling water storage tank and supplying the cooling water/inert gas mixture to the molten core material retention tank.

The molten core material retention tank may include: an outer retention vessel having at least one coolant hole formed in a side or bottom thereof and connected to the mixing means; a porous protection vessel formed of refractory material at an inside of the outer retention vessel; and a gravel layer formed between the outer retention vessel and the porous protection vessel, and filled with refractory gravels.

The gravels may be filled in the gravel layer to distribute and support the load of molten core material retained in the porous protection vessel.

The mixing means may include pipes connected and extended respectively from the compressed gas tank and the cooling water storage tank.

The porous protection vessel may be made by sintering refractory gravel or powder and on the inner surface of protection vessel, a layer of sacrificial and water tight material is cemented, and the outer retention vessel may have a screen layer formed on an inner surface thereof.

The cooling water storage tank may have a check valve installed at the outlet thereof so as to prevent the back flow of high-pressure gas.

The apparatus may further include an intermediate storage tank. Accordingly, steam generated by the reaction between the molten core material and the cooling water is condensed into water on the wall of the reactor containment and the condensed water is resupplied through the intermediate storage tank to the cooling water storage tank.

The intermediate storage tank may have a filter installed in an upper side thereof to filter the condensed water through the filter, whereby the filtered water is resupplied to the cooling water storage tank.

BRIEF DESCRIPTION OF THE DRAWINGS

The above objects, other features and advantages of the present invention will become more apparent by describing the preferred embodiments thereof with reference to the accompanying drawings, in which:

FIG. 4 is a perspective view of a molten core material retention tank shown in FIG. 3;

FIG. 5 is a side sectional view of the molten core material retention tank shown in FIG. 4; and FIG. 6 is a perspective view of an outer retention vessel of the molten core material retention tank shown in FIG. 4.

DETAILED DESCRIPTION OF THE INVENTION

Hereinafter, preferred embodiments of the present invention will be described in detail with reference to the attached drawings.

Figure 1:
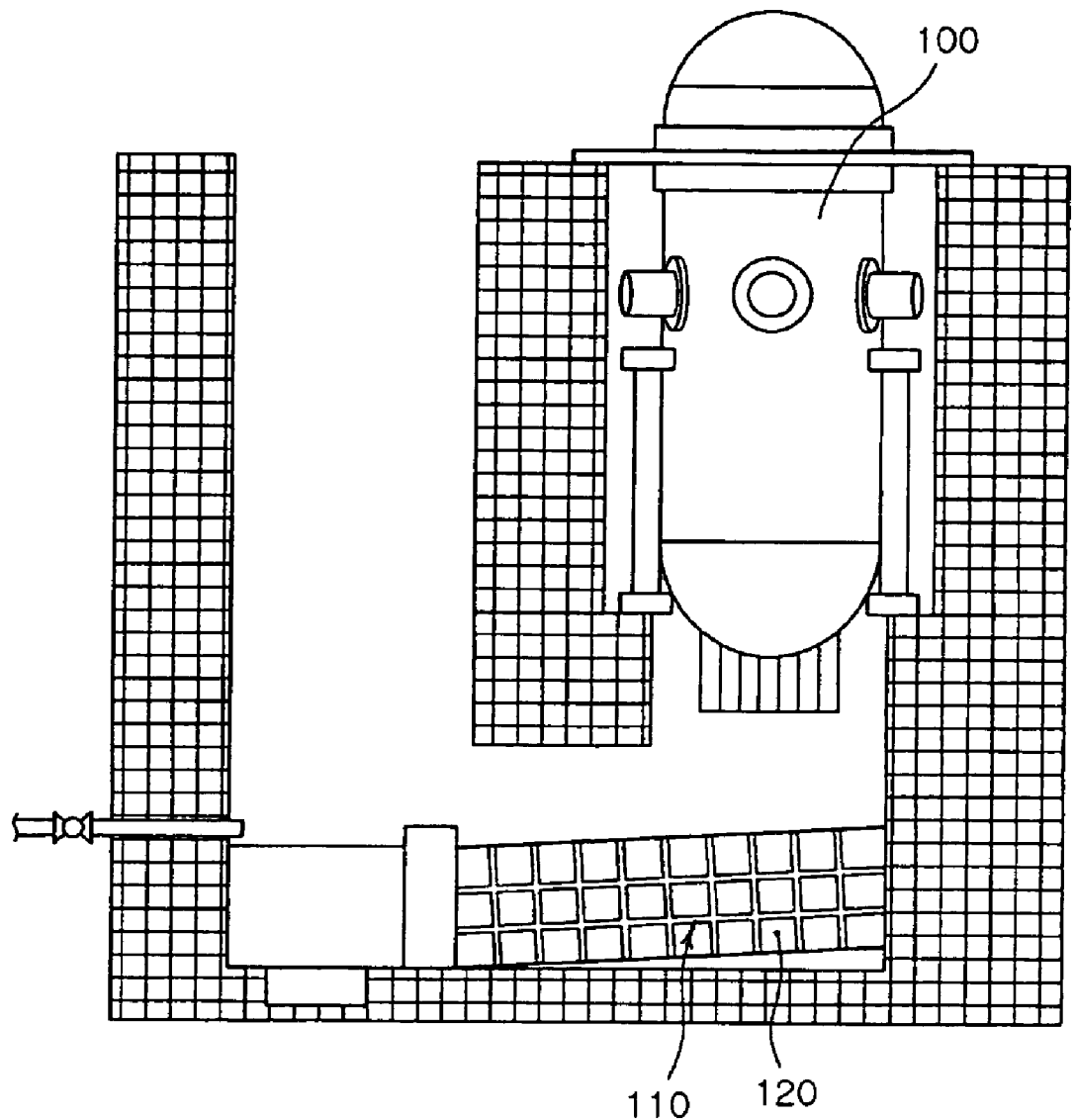
FIG. 1 is a schematic view of a conventional molten core material cooling apparatus.
Figure 2:
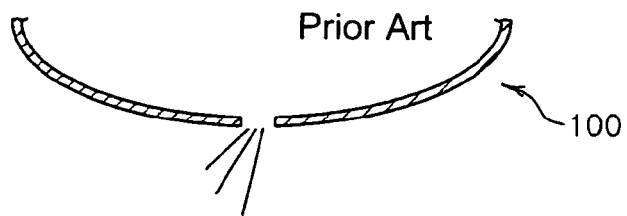
FIG. 2 is a schematic view of a conventional molten core material retaining apparatus.
Figure 2:
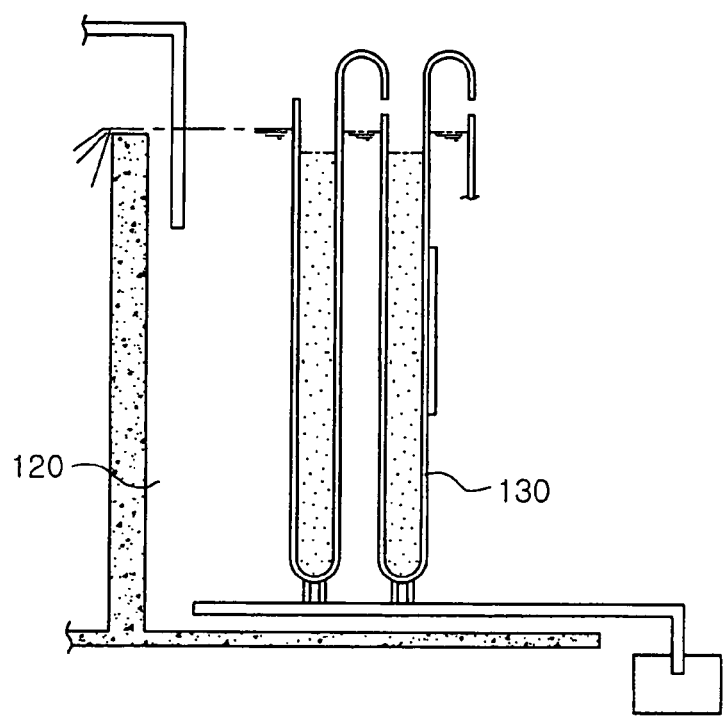
Figure 3:
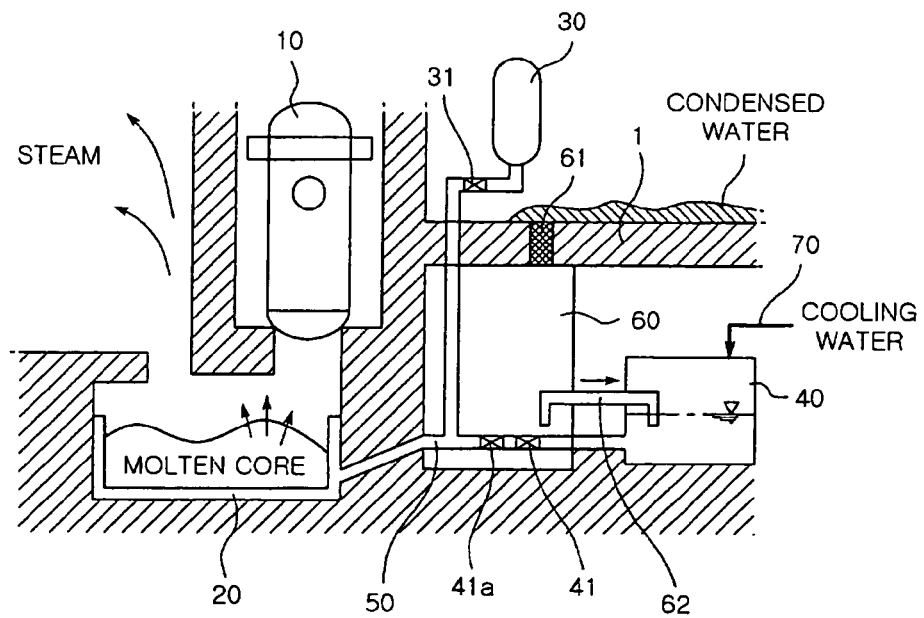
FIG. 3 is a schematic view of an apparatus for passively cooling and retaining molten core material according to the present invention.

FIG. 3 is a schematic view of an apparatus for passively cooling and retaining molten core material according to the present invention.

Referring to FIG. 3, the inventive passive cooling and retaining apparatus cools and retains molten core material from a reactor vessel, and includes a molten core material retention tank 20 installed below a reactor vessel 10 so as to retain molten core material discharged from the reactor vessel 10.

The molten core material retention tank 20 is configured not only to endure high-temperature molten core material, but also to uniformly provide cooling water for uniformly cooling the high-temperature molten core material. A structure of the molten core material retention tank 20 will be described in detail later with reference to FIGS. 4 through 6.

As shown in FIG. 3, the inventive passive cooling and retaining apparatus further includes a cooling water storage tank 40 installed in a containment building 1, and a compressed gas tank 30 for storing a high-pressure inert gas. The cooling water storage tank 40 and the compressed gas tank 30 respectively have outlet valves 41 and 31 at their outlets.

Here, the cooling water storage tank 40 is preferably installed higher than the molten core material retention tank 20 so that the cooling water thereof can passively flow down into the molten core material retention tank 20 by gravity.

Also, a check valve 41a is preferably installed at the outlet of the cooling water storage tank 40 so as to prevent the backflow of the high-pressure inert gas.

Inert gas flowing down from the compressed gas tank 30 is mixed with cooling water flowing from the cooling water storage tank 40 by a mixer 50, and then supplied to the molten core material retention tank 20.

Here, the mixer 50 is preferably of pipes connected and extended respectively from the tanks 30 and 40.

Accordingly, the mixer 50 can simply mix the inert gas having flowed down from the tank 30 with the cooling water having flowed down from the tank 40, and the resulting mixture of the cooling water and the inert gas is supplied to both the inner bottom and side surfaces of the molten core material retention tank 20, whereby molten core material in the molten core material retention tank 20, whereby molten core material in the molten core material retention tank 20 can be more effectively cooled due to the large contact area between the molten core material and the supplied cooling water/inert gas mixture.

As shown in FIG. 3, the passive cooling and retaining apparatus of the invention may further include an intermediate storage tank 60.

Then, when steam generated by the reaction between the molten core material and the cooling water is condensed on the inner surface of the containment building 1, the condensed water can flow along the inner surface of the containment building 1 and then down via the intermediate storage tank 60 into the intermediate storage tank 60.

In addition, the intermediate storage tank 60 preferably has a filter 61 installed in an upper side thereof to filter the condensed water. The condensed and filtered water is then recirculated via the intermediate storage tank 60 into the cooling water storage tank 40.

In this case, the intermediate storage tank 60 is connected with the cooling water storage tank 40 via a pipe 62, by which the condensed water can be resupplied via the intermediate storage tank 60 into the cooling water storage tank 40.

In this manner, the direct contact between the molten core material and the cooling water makes it possible to effectively remove the heat from the molten core material. Also, the inert gas supplied along with the cooling water can prevent steam explosion that may be generated by a violent interaction between the ultrahigh-temperature molten core material and the cooling water, thereby making it possible to stably cool the molten core material.

Further, the invention is so .designed that the steam produced through the reaction between the molten core material and the cooling water can be condensed and the condensed water can be recycled through the intermediate storage tank, by which the decay heat can be efficiently removed from the molten core material.

Furthermore, the inventive passive cooling device supplies the cooling Water and the inert gas and recycles the condensed water by gravity, thereby making it possible to cool the Molten core material more reliably than the conventional active cooling device using a pump.

FIGS. 4 through 6 illustrate the molten core material retention tank in detail, which will be described as follows.

Referring to FIG. 4, the molten core material retention tank 20 is connected through a coolant hole 21a with the mixer 50 of pipes, and is simultaneously supplied with the inert gas and the cooling water through the coolant hole 21a from the mixer 50, thereby cooling the high-temperature molten core material retained therein.

Here, the molten core material retention tank 20 can more effectively cool the high-temperature molten core material due to the large contact area between the molten core material and the cooling water because the cooling water/inert gas mixture is supplied to both the inner bottom and side surfaces of the molten core material retention tank 20.

Describing the structure of the invention in more detail referring to FIGS. 4 and 5, the molten core material retention tank 20 includes an outer retention vessel 21, an inner porous protection vessel 23, and a gravel layer 22 formed between the vessels 21 and 23.

The outer retention vessel 21 includes at least one coolant hole 21a formed in a side or bottom surface thereof The coolant hole 21a in the bottom surface of the outer retention vessel 21 is depicted by an imaginary line in FIG. 5 to generally indicate that the bottom surface may include the coolant hole 21a rather than indicating a specific location for the coolant hole 21a in the bottom surface. The coolant hole 21a is connected to the mixer 50, whereby the cooling water/inert gas mixture is supplied through the coolant hole 21a to the molten core material retention tank 20.

The inner porous protection vessel 23 inside the outer retention vessel 21 is preferably made of sintered refractory gravels or powder so as to endure the high-temperature molten core material. Accordingly, the cooling water/inert gas mixture can smoothly flow into the molten core material retention tank 20.

The inner porous protection vessel 23 can be of several separate cylinder walls that can be assembled in a compartment structure. Also, the inner porous protection vessel 23 is made by firing refractory gravel or powder like a ceramic structure, and thus can be easily adjusted according to the shapes of the compartment. On the surface of the protection vessel, a layer of sacrificial material is cemented thick enough to provide the structural integrity and water tightness of the protection vessel 23. The sacrificial material has advantages of diluting the molten core material, having flexibility in responding to the various pattern of melt discharge from the reactor vessel. Also, as it provides water tightness of the protection vessel, inadvertent opening the valves 31, 41, and 41a during the power operation would not result in a flooding of the reactor cavity. So, any mis-operation of this invention would not have interference during the power operation of the nuclear reactor. So, it supports fully passive nature of the invention.

The porous structure of the protection vessel 23 enables the cooling water/inert gas mixture to be uniformly injected through the pores thereof into the molten core material retention tank 20, and is highly endurable against the ultrahigh-temperature molten core material, thereby potentially preventing the direct contact between the ultrahigh-temperature molten core. material and a neighboring structure. Also, due to its structure, the molten core material retention tank 20 can be removed or replaced by a new one after a severe accident.

Regarding the gravel layer 22, it is formed by filling refractory gravels 22a between the vessels 21 and 23, and thus can be easily formed to conform to the shape of the compartment due to the flowable nature of the refractory gravels 22a.

The gravel layer 22 enables the cooling water/inert gas mixture to be uniformly injected into the molten core material retention tank 20. Also, the gravel layer 22 can store therein a predetermined amount of cooling water, thereby making it possible to more effectively cool the high-temperature molten core material.

The gravel layer 22 is filled with the gravels 22a for supporting the weight of the molten core material retained in the porous protection vessel 23. That is, the gravels 22a of the gravel layer 22 themselves can distribute and support the weight of the molten core material. Accordingly, the present invention can support the load of the molten core material without having to use a separate supporting unit.

Also, the supply amount of the cooling water/inert gas mixture can be suitably adjusted by changing the arrangement of the coolant hole 21a and the gravels 22a.

That is, the gravel 22a size of the gravel layer 22 and the pore size of the porous protection vessel 23 can be adjusted suitably according to the size of a reactor cavity and the total amount of the molten core material, whereby the molten core material retention tank 20 can be optimally supplied with the cooling water/inert gas mixture.

FIG. 6 is a perspective view of the outer retention vessel 21 of the molten core material retention tank 20. Referring to FIG. 6, the outer retention vessel 21 preferably has a screen layer 21b formed on an inner surface thereof to border the gravel layer 22.

The screen layer 21b is designed to prevent the gravels 22a from emerging through the coolant hole 21a, and supplying the cooling water/inert gas mixture more uniformly.

An operation of the inventive passive cooling and retaining apparatus will now be described in detail with reference to FIGS. 3 through 6.

Referring to FIGS. 3 through 6, when a severe accident takes place in a nuclear plant, discharging ultrahigh-temperature radioactive molten core material from a damaged nuclear reactor into a reactor cavity, the discharged molten core material is retained in the molten core material retention tank 20 installed below the reactor vessel 10.

When the outlet valves 31 and 41 are opened, the inert gas and the cooling water respectively flow down from the compressed gas tank 30 and the cooling water storage tank 40 by pressure and gravity and are mixed in the mixer 50. The cooling water/inert gas mixture is then supplied to the molten core material retention tank 20, when the molten material discharged from the reactor vessel is accumulated enough to cause a failure of a sacrificial water tight layer on the inner surface of the protection vessel 23.

At this time, the cooling water storage tank 40 is preferably installed higher than the molten core material retention tank 20 so that the cooling water thereof can be smoothly supplied to the molten core material retention tank 20 by gravity. Also, the check valve 41a is preferably installed at the outlet of the cooling water storage tank 40 so as to prevent the back flow of the high-pressure inert gas.

Here, the molten core material retention tank 20 includes the outer retention vessel 21, the inner porous protection vessel 23 and the gravel layer 22 formed between the vessels 21 and 23 as shown in FIGS. 4 and 5.

The outer retention vessel 21 includes at least one coolant hole 21a formed in a side or bottom surface thereof. The coolant hole 21a is connected to the mixer 50, whereby the cooling water/inert gas mixture is supplied through the coolant hole 21a to the molten core material retention tank 20.

The porous protection vessel 23 and the gravel layer 22 are preferably made of refractory material so as to endure the high-temperature molten core material. The porous structures of the protection vessel 23 and the gravel layer 22 enable the uniform supply of the cooling water/inert gas mixture.

After the molten core material is primarily cooled in the molten core material retention tank 20 as stated above, steam generated by the reaction between the molten core material and the cooling water is emitted into the atmosphere over the containment building 1 and is then condensed on an upper outer surface of the containment building 1. The condensed water is resupplied through the intermediate storage tank 60 and the pipe 62 to the cooling water storage tank 40.

At this time, the intermediate storage tank 60 preferably has the filter 61 installed on an upper side thereof, and thus the condensed water is filtered by the filter 61 before flowing into the intermediate storage tank 60.

Also, a feedwater line 70 for suitably supplying feedwater is connected to the cooling water storage tank 40.

The cooling water/inert gas mixture is supplied to both the bottom and side surfaces of the molten core material by opening the outlet valves 31 and 41 before the solidification of high-temperature molten core material, whereby the molten core material is primarily cooled so that a crack-type flow channel can be formed in a solidified molten core material. Thereafter, cooling water is supplied to the crack-type flow channel of the solidified molten core material, whereby the decay heat of the solidified molten core material is removed.

As stated above, the present invention can passively supply the cooling water/inert gas mixture during the primary cooling process thereby to greatly reduce the threat of a steam explosion, which may be caused by the rapid reaction between the high-temperature molten core material and the cooling water. Also, the present invention makes it possible to effectively remove the decay heat of the molten core material by passively recycling the condensed water.

Further, the present invention makes it possible to separately make and assembly the molten core material retention tank suitably according to the size of the reactor cavity, and to install the molten core material retention tank in the reactor cavity even for an existing nuclear reactor.

Because the sacrificial and water tight layer is cemented on the protection vessel 23, inadvertent opening the valves 31, 41, and 41a during the power operation would not result in a flooding of the reactor cavity. So, any mis-operation of this invention would not interfere with the normal power operation of the nuclear reactor. Accordingly, this feature fully supports the passive nature of the invention.

Although the preferred embodiments of the present invention have been disclosed for illustrative purpose, those skilled in the art will appreciate that various modifications, additions and substitutions can be made without departing from the scope and spirit of the invention as defined in the accompanying claims.

INDUSTRIAL APPLICABILITY

The inventive passive cooling and retaining apparatus can prevent steam explosion by supplying the cooling water/inert mixture to both the bottom and side surfaces of the ultrahigh-temperature molten core material, thereby making it possible to greatly enhance the reliability of the cooling process.

Also, the present invention makes it possible to install the molten core material retention tank in the reactor cavity without changing the compartment structure of the containment building of the nuclear plant even for the existing nuclear reactor and it can be installed easily in the newly constructed nuclear reactor.

Further, the molten core material retention tank, of this invention includes the outer retention vessel, the inner porous protection vessel, and the gravel layer formed between the vessels. Accordingly, the cooling water/inert gas mixture can be uniformly injected into the molten core material retention tank, a predetermined amount of cooling water can be stored in the gravel layer, and the gravel layer can distribute and support the weight of the molten core material.

Furthermore, the present invention makes it possible to effectively remove the decay heat of the molten core material by passively recycling the cooling water through the intermediate storage tank.

As the protection vessel with a layer of sacrificial material provides water tightness and structural integrity, any mis-operation of this invention would not interfere with the normal power operation of the nuclear reactor.

The invention claimed is:

1. An apparatus for passively cooling and retaining molten core material from a reactor vessel, the apparatus comprising:
   a molten core material retention tank configured to be installed inside a reactor cavity to retain molten core material from the reactor vessel;
   a compressed gas tank having an outlet valve at an outlet thereof and supplying inert gas;
   a cooling water storage tank being installed higher than the molten core material retention tank, having an outlet valve at an outlet thereof, and supplying cooling water; and
   a mixer including piping respectively extending from the compressed gas tank and the cooling water storage tank, connected to each other to mix an inert gas from the compressed gas tank with cooling water from the cooling water storage tank, and supplying a mixture of the inert gas and the cooling water to the molten core material retention tank to prevent a steam explosion.

2. The apparatus of claim 1, wherein the molten core material retention tank comprises:
   an outer retention vessel having at least one coolant hole formed in a side or bottom thereof and connected to the mixer;
   a porous protection vessel formed of refractory material at an inside of the outer retention vessel; and
   a gravel layer formed between the outer retention vessel and the porous protection vessel, and filled with refractory gravels.

3. The apparatus of claim 2, wherein the gravels are filled in the gravel layer to distribute and support the load of molten core material retained in the porous protection vessel.

4. The apparatus of claim 1, further comprising an intermediate storage tank, wherein steam generated by a reaction between the molten core material and the cooling water is condensed into water and the condensed water is resupplied through the intermediate storage tank to the cooling water storage tank.

5. The apparatus of claim 2, wherein the porous protection vessel comprises sintered refractory gravel or powder, and a layer of sacrificial and water tight material cemented on a surface of the protection vessel.

6. The apparatus of claim 2, wherein the outer retention vessel has a screen layer formed on an inner surface thereof.

7. The apparatus of claim 1, wherein the cooling water storage tank has a check valve installed at the outlet thereof so as to prevent the backflow of gas.

8. The apparatus of claim 4, wherein the intermediate storage tank has a filter installed in an upper side thereof to filter the condensed water through the filter, whereby the filtered water is resupplied to the cooling water storage tank.

* * * * *